US010282876B1

(12) United States Patent
Tulenko et al.

(10) Patent No.: US 10,282,876 B1
(45) Date of Patent: *May 7, 2019

(54) TRACKING ENVIRONMENTAL CONTAMINANTS

(71) Applicant: ALLSCRIPTS SOFTWARE, LLC, Chicago, IL (US)

(72) Inventors: Alexander Tulenko, Wake Forest, NC (US); David Thomas Windell, Raleigh, NC (US)

(73) Assignee: ALLSCRIPTS SOFTWARE, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/614,153

(22) Filed: Jun. 5, 2017

Related U.S. Application Data

(63) Continuation of application No. 14/557,460, filed on Dec. 2, 2014, now Pat. No. 9,672,644.

(51) Int. Cl.
| *G06F 19/00* | (2018.01) |
| *G06T 11/00* | (2006.01) |
| *G06T 11/20* | (2006.01) |
| *G06T 11/60* | (2006.01) |
| *G06F 17/30* | (2006.01) |

(52) U.S. Cl.
CPC ...... *G06T 11/206* (2013.01); *G06F 17/30991* (2013.01); *G06T 11/60* (2013.01)

(58) Field of Classification Search
None
See application file for complete search history.

(56) References Cited

U.S. PATENT DOCUMENTS

| 9,672,644 | B1* | 6/2017 | Tulenko | G06T 11/206 |
| 2003/0163351 | A1* | 8/2003 | Brown | A61B 5/0002 |
| | | | | 705/2 |
| 2009/0299767 | A1* | 12/2009 | Michon | G06Q 50/22 |
| | | | | 705/3 |
| 2013/0063278 | A1* | 3/2013 | Prosser | G01F 23/74 |
| | | | | 340/870.02 |
| 2013/0282154 | A1* | 10/2013 | Chappell | G05B 15/02 |
| | | | | 700/90 |
| 2016/0034818 | A1* | 2/2016 | Knecht | E21B 41/00 |
| | | | | 166/308.1 |
| 2016/0180060 | A1* | 6/2016 | Nelson | A01G 22/00 |
| | | | | 702/19 |

* cited by examiner

*Primary Examiner* — Tize Ma
(74) *Attorney, Agent, or Firm* — Loza & Loza, LLP; Peter Zura

(57) ABSTRACT

A method for generating a visualization for tracking an environmental contaminant includes automatically generating a contaminant visualization map for a particular contaminant. The contaminant visualization map includes a plurality of markers each corresponding to a location associated with a medical case associated with exposure to the particular contaminant, and one or more markers each corresponding to a location of an identified contamination source for the particular contaminant. The method further includes receiving an indication to zoom out the contaminant visualization map, generating one or more heat maps corresponding to the medical cases associated with exposure to the particular contaminant, and updating the contaminant visualization map to be zoomed out, not display the plurality of markers each corresponding to a location associated with a medical case, and display the generated one or more heat maps.

20 Claims, 10 Drawing Sheets

TRACKING ENVIRONMENTAL CONTAMINANTS

INCORPORATION BY REFERENCE

The present application hereby incorporates herein by reference the entire disclosure of Appendix A attached hereto.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to tracking environmental contaminants, or contaminates.

Environmental contaminants can pose a serious health risk to an area. For example, arsenic which leaches into groundwater wells can cause health issues for anyone exposed to the contaminated water. Traditionally, contamination is tracked by taking environmental samples. For example, water samples might be taken at various wells in an area with suspected arsenic contamination to try to determine which wells are contaminated.

A need exists for improvement in tracking environmental contaminants. This, and other needs, are addressed by one or more aspects of the present invention.

SUMMARY OF THE INVENTION

The present invention includes many aspects and features. Moreover, while many aspects and features relate to, and are described in, the context of a healthcare application for tracking environmental contaminants, the present invention is not limited to use only in this context, as will become apparent from the following summaries and detailed descriptions of aspects, features, and one or more embodiments of the present invention.

Accordingly, one aspect of the present invention relates to a method for generating a visualization for tracking an environmental contaminant which includes automatically generating a contaminant visualization map for a particular contaminant. The contaminant visualization map includes a plurality of markers each corresponding to a location associated with a medical case associated with exposure to the particular contaminant, and one or more markers each corresponding to a location of an identified contamination source for the particular contaminant. The method further includes receiving an indication to zoom out the contaminant visualization map, generating one or more heat maps corresponding to the medical cases associated with exposure to the particular contaminant, and updating the contaminant visualization map to be zoomed out, not display the plurality of markers each corresponding to a location associated with a medical case, and display the generated one or more heat maps.

Another aspect relates to a method for generating a visualization for tracking an environmental contaminant. The method includes accessing, by a first electronic device via a browser, a patient portal at a web server; displaying, to a first patient via a display associated with the first electronic device, a patient portal interface for the patient portal configured to allow a user to select one or more symptoms they are suffering from; receiving, from the first patient via one or more input devices associated with the first electronic device, input corresponding to identification of a first plurality of symptoms he or she is suffering from; communicating, from the web server to a data store, data representative of the first plurality of symptoms together with data representative of one or more locations associated with the first patient; accessing, by a second electronic device via a browser, the patient portal at the web server; displaying, to a second patient via a display associated with the second electronic device, a patient portal interface for the patient portal configured to allow a user to select one or more symptoms they are suffering from; receiving, from the second patient via one or more input devices associated with the second electronic device, input corresponding to identification of a second plurality of symptoms he or she is suffering from; communicating, from the web server to a data store, data representative of the second plurality of symptoms together with data representative of one or more locations associated with the second patient; accessing, by a third electronic device, data from the data store; automatically identifying using one or more electronic processors, utilizing the data representative of the first plurality of symptoms identified by the first patient, the first patient as having been exposed to a particular contaminant; automatically identifying using one or more electronic processors, utilizing the data representative of the second plurality of symptoms identified by the second patient, the second patient as having been exposed to the particular contaminant; automatically generating using one or more electronic processors, utilizing the accessed data from the data store, a contaminant visualization map for the particular contaminant including a plurality of markers each corresponding to a location associated with a medical case of a first plurality of medical cases associated with exposure to the particular contaminant, and one or more markers each corresponding to a location of an identified contamination source for the particular contaminant, wherein a first one of the plurality of markers was generated based on the automatic identification of the first patient as having been exposed to the particular contaminant and is located on the contaminant visualization map at a point corresponding to one of the one or more locations associated with the first patient, wherein a second one of the plurality of markers was generated based on the automatic identification of the second patient as having been exposed to the particular contaminant and is located on the contaminant visualization map at a point corresponding to one of the one or more locations associated with the second patient; displaying, to a health worker via a display associated with a third electronic device, the contaminant visualization map; receiving, from the health worker via an input device associated with the third electronic device, input corresponding to an indication to zoom out the contaminant visualization map; automatically generating using one or more electronic processors, based on the accessed data from the data store, one or more heat maps corresponding to the first plurality of medical cases associated with exposure to the particular contaminant; updating, in response to the received input corresponding to an indication to zoom out the contaminant visualization map, the contaminant visualization map to be zoomed out, not display the plurality of markers each corresponding to a location associated with a medical case, and display the generated one or more heat maps.

In a feature of this aspect, the web server comprises one or more physical servers.

In a feature of this aspect, the web server comprises a cloud server.

In a feature of this aspect, each of the plurality of markers corresponding to a location associated with a medical case is a dot.

In a feature of this aspect, each of the plurality of markers corresponding to a location associated with a medical case is a flag.

In a feature of this aspect, each of the plurality of markers corresponding to a location associated with a medical case is a pin.

In a feature of this aspect, a user can click on one of the plurality of markers corresponding to a location associated with a medical case to get more information for that medical case.

In a feature of this aspect, a user can hover over one of the plurality of markers corresponding to a location associated with a medical case to get more information on that medical case.

In a feature of this aspect, the first electronic device comprises a laptop.

In a feature of this aspect, the first electronic device comprises a tablet.

In a feature of this aspect, the first electronic device comprises a desktop computer.

In a feature of this aspect, the first electronic device comprises a phone.

In a feature of this aspect, the third electronic device comprises a laptop.

In a feature of this aspect, the third electronic device comprises a tablet.

In a feature of this aspect, the third electronic device comprises a desktop computer.

In a feature of this aspect, the third electronic device comprises a phone.

In a feature of this aspect, the one or more input devices associated with the first electronic device comprise a mouse and keyboard.

In a feature of this aspect, the one or more input devices associated with the first electronic device comprise a touch screen.

In a feature of this aspect, the input device associated with the third electronic device comprises a mouse.

In a feature of this aspect, the input device associated with the third electronic device comprises a touch screen.

In a feature of this aspect, automatically identifying using one or more electronic processors, utilizing the data representative of the first plurality of symptoms identified by the first patient, the first patient as having been exposed to a particular contaminant comprises automatically identifying using one or more electronic processors, utilizing the data representative of the first plurality of symptoms identified by the first patient and data representative of a location associated with the first patient, the first patient as having been exposed to a particular contaminant.

Another aspect relates to a method for generating a visualization for tracking an environmental contaminant. The method includes loading, at a first electronic device, a patient portal application; displaying, to a first patient via a display associated with the first electronic device, a patient portal interface for the patient portal application configured to allow a user to select one or more symptoms they are suffering from; receiving, from the first patient via one or more input devices associated with the first electronic device, input corresponding to identification of a first plurality of symptoms he or she is suffering from; communicating, from the web server to a data store, data representative of the first plurality of symptoms together with data representative of one or more locations associated with the first patient; loading, at a second electronic device, the patient portal application; displaying, to a second patient via a display associated with the second electronic device, a patient portal interface for the patient portal application configured to allow a user to select one or more symptoms they are suffering from; receiving, from the second patient via one or more input devices associated with the second electronic device, input corresponding to identification of a second plurality of symptoms he or she is suffering from; communicating, from the web server to a data store, data representative of the second plurality of symptoms together with data representative of one or more locations associated with the second patient; accessing, by a third electronic device, data from the data store; automatically identifying using one or more electronic processors, utilizing the data representative of the first plurality of symptoms identified by the first patient, the first patient as having been exposed to a particular contaminant; automatically identifying using one or more electronic processors, utilizing the data representative of the second plurality of symptoms identified by the second patient, the second patient as having been exposed to the particular contaminant; automatically generating using one or more electronic processors, utilizing the accessed data from the data store, a contaminant visualization map for the particular contaminant including a plurality of markers each corresponding to a location associated with a medical case of a first plurality of medical cases associated with exposure to the particular contaminant, and one or more markers each corresponding to a location of an identified contamination source for the particular contaminant, wherein a first one of the plurality of markers was generated based on the automatic identification of the first patient as having been exposed to the particular contaminant and is located on the contaminant visualization map at a point corresponding to one of the one or more locations associated with the first patient, wherein a second one of the plurality of markers was generated based on the automatic identification of the second patient as having been exposed to the particular contaminant and is located on the contaminant visualization map at a point corresponding to one of the one or more locations associated with the second patient; displaying, to a health worker via a display associated with a third electronic device, the contaminant visualization map; receiving, from the health worker via an input device associated with the third electronic device, input corresponding to an indication to zoom out the contaminant visualization map; automatically generating using one or more electronic processors, based on the accessed data from the data store, one or more heat maps corresponding to the first plurality of medical cases associated with exposure to the particular contaminant; updating, in response to the received input corresponding to an indication to zoom out the contaminant visualization map, the contaminant visualization map to be zoomed out, not display the plurality of markers each corresponding to a location associated with a medical case, and display the generated one or more heat maps.

Another aspect relates to a method for generating a visualization for tracking an environmental contaminant. The method includes automatically generating using one or more electronic processors, utilizing accessed data from one or more data stores, a contaminant visualization map for a particular contaminant including a plurality of markers each corresponding to a location associated with a medical case of a first plurality of medical cases associated with exposure to the particular contaminant, and one or more markers each corresponding to a location of an identified contamination source for the particular contaminant; displaying, to a health worker via a display associated with a third electronic device, the contaminant visualization map; receiving, from the health worker via an input device associated with an electronic device, input corresponding to an indication to zoom out the contaminant visualization map; automatically generating using one or more electronic processors, based on the accessed data from the data store, one or more heat maps corresponding to the first plurality of medical cases associated with exposure to the particular contaminant; updating, in response to the received input corresponding to an indication to zoom out the contaminant visualization map, the contaminant visualization map to be zoomed out, not display the plurality of markers each corresponding to a location associated with a medical case, and display the generated one or more heat maps.

Another aspect relates to one or more non-transitory computer readable media containing instructions configured for performing a disclosed method.

Another aspect relates to a system for performing a disclosed method.

Another aspect relates to software for a disclosed method.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1:
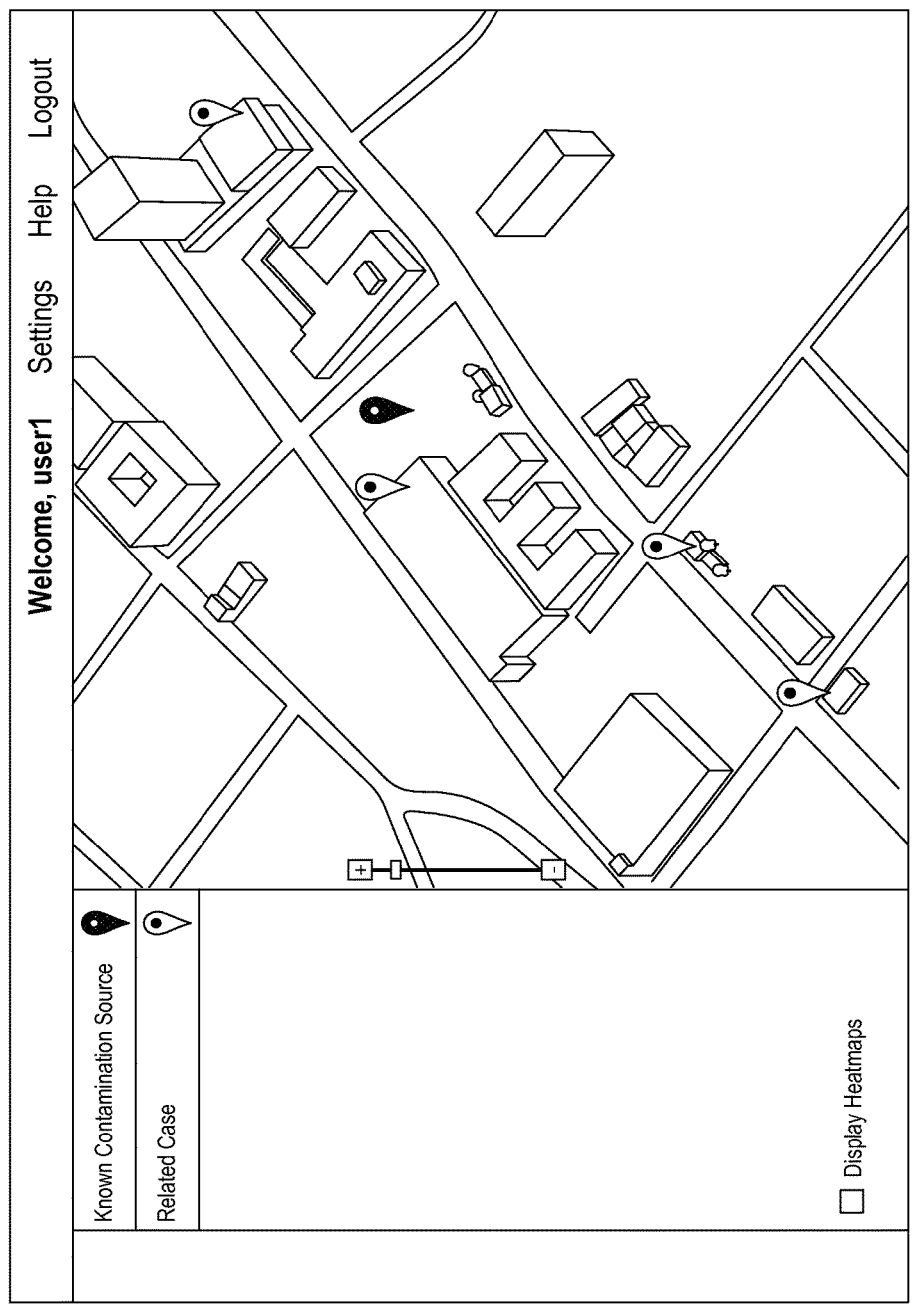
FIG. 1 illustrates an exemplary interface in accordance with one or more preferred implementations in which the location of each of a plurality of medical cases associated with a particular contaminant is represented on a zoomed-in contaminant visualization map by a marker.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention in any claim of a patent issuing here from, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. 112, paragraph 6 or subsection (f), no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

As noted above, environmental contaminants can pose a serious health risk to an area.

One or more preferred implementations relate to software and methodologies which allow medical professionals to better analyze and help areas affected by contaminants and pollutants by means of graphical representation of affected areas. In accordance with one or more preferred implementations, software is configured to display a geographical representation in the form of a map with markers indicating cases corresponding to one or more contaminants being considered. Preferably, a marker will also be shown on the map indicating known sources of contaminants. Preferably, a user can scroll in and out of the map to review contaminant information at various levels of detail.

In accordance with one or more preferred implementations, known cases of medical conditions associated with a contaminant being studied would be represented on the map by a marker such as a flag, pointer, or small dot when the user is zoomed in on an area.

FIG. 1 illustrates an exemplary interface in accordance with one or more preferred implementations in which the location of each of a plurality of medical cases associated with a particular contaminant is represented on a zoomed-in contaminant visualization map by a marker. The contaminant visualization map further displays a marker indicating a known contamination source for the particular contaminant.

Figure 2:
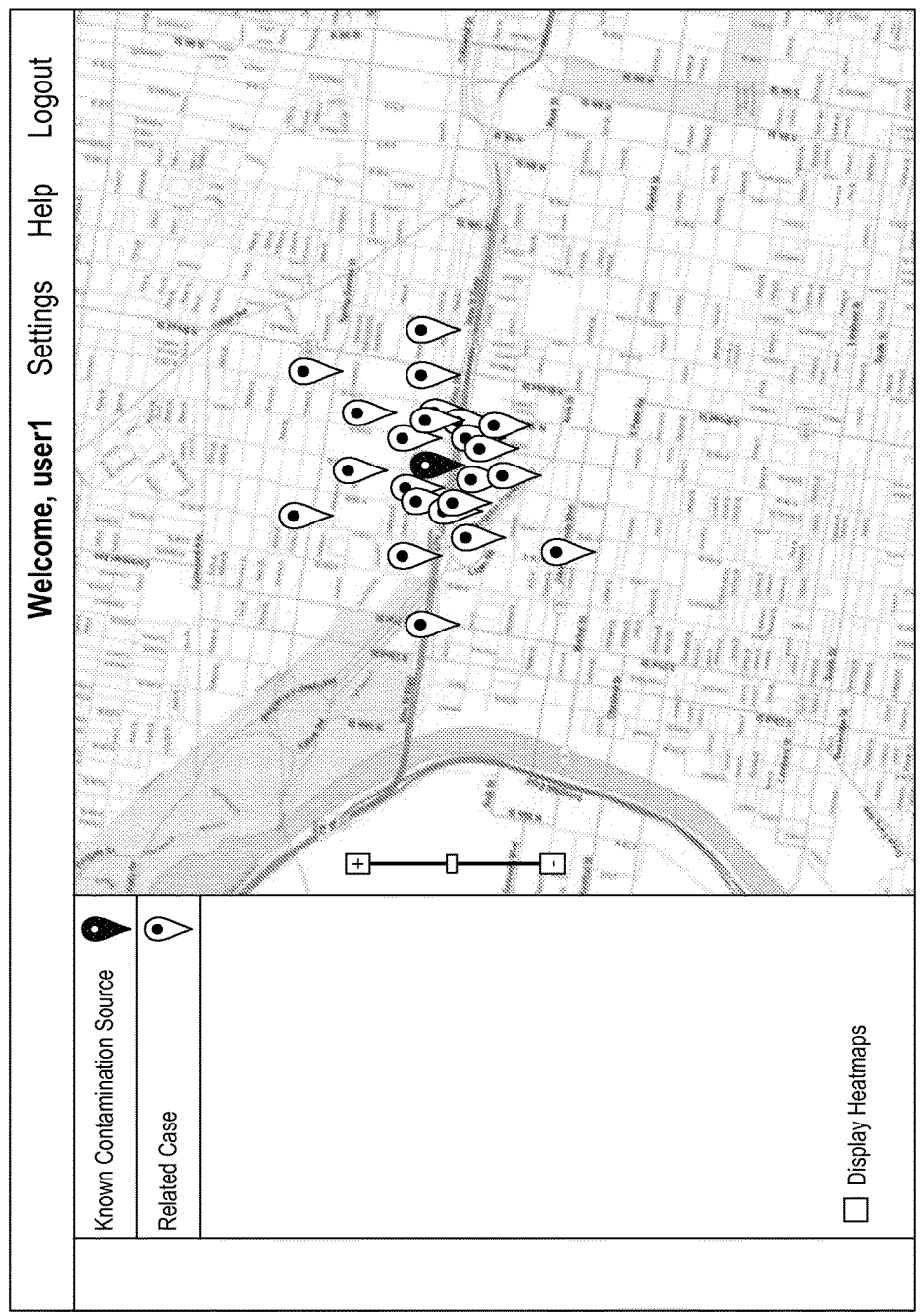
FIG. 2 illustrates a contaminant visualization map which has been zoomed out to have a larger scale than the map illustrated in FIG. 1.

Preferably, a user can zoom in and out of the map. FIG. 2 illustrates a contaminant visualization map which has been zoomed out to have a larger scale than the map illustrated in FIG. 1. The contaminant visualization map continues to display a plurality of markers indicating medical cases associated with the particular contaminant, and a marker indicating a known contamination source for the particular contaminant.

Figure 3:
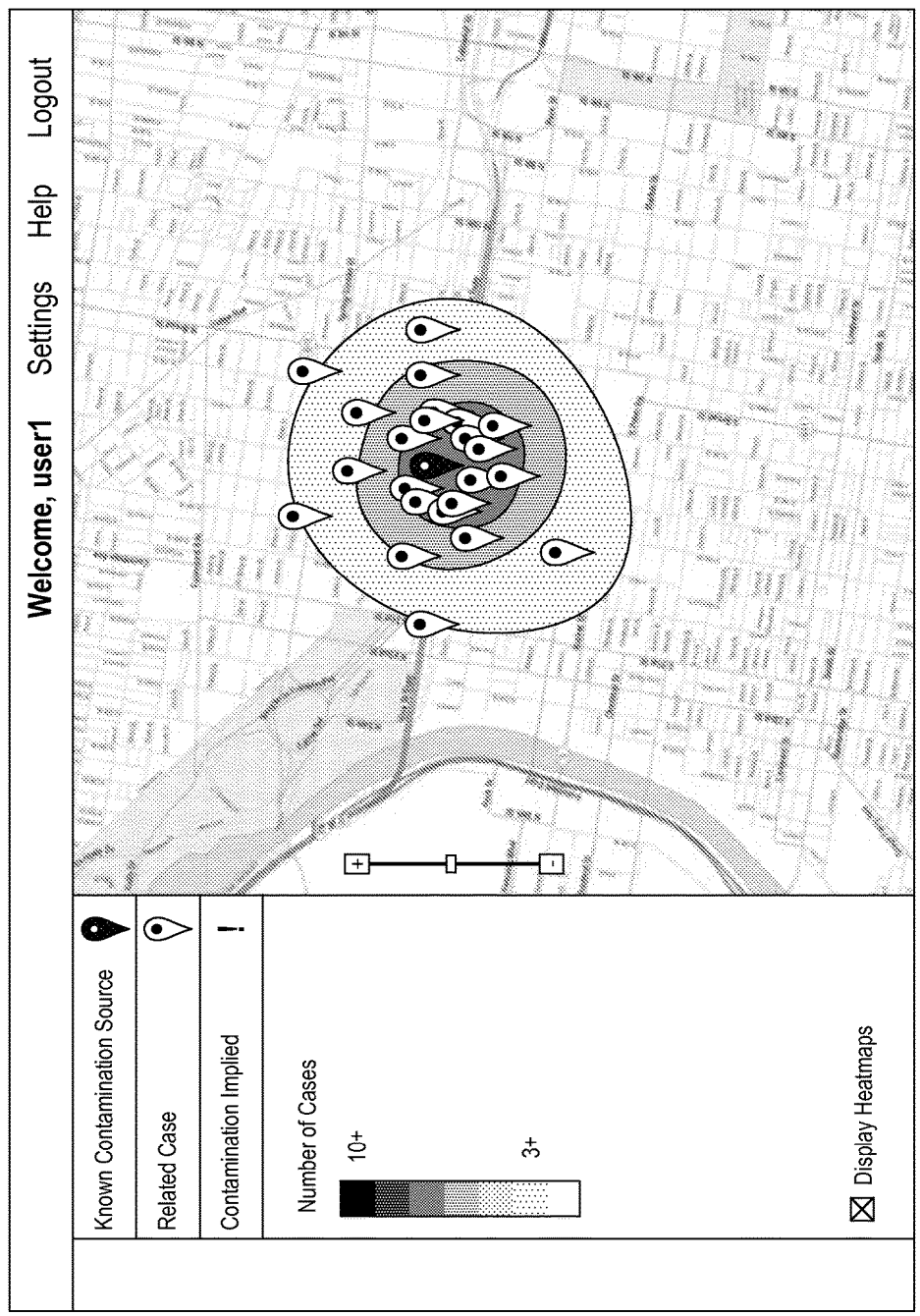
FIG. 3 illustrates the contaminant visualization map of FIG. 2 with a heat map displayed that has been generated based on the medical cases associated with the particular contaminant.

In accordance with one or more preferred implementations, an interface is configured for display of a heat map visually indicating the number and/or density of cases in areas of a contaminant visualization map. FIG. 3 illustrates the contaminant visualization map of FIG. 2 with a heat map displayed that has been generated based on the medical cases associated with the particular contaminant.

In accordance with one or more preferred implementations, heat maps can be toggled on or off by a control, as illustrated in FIG. 3.

Figure 4:
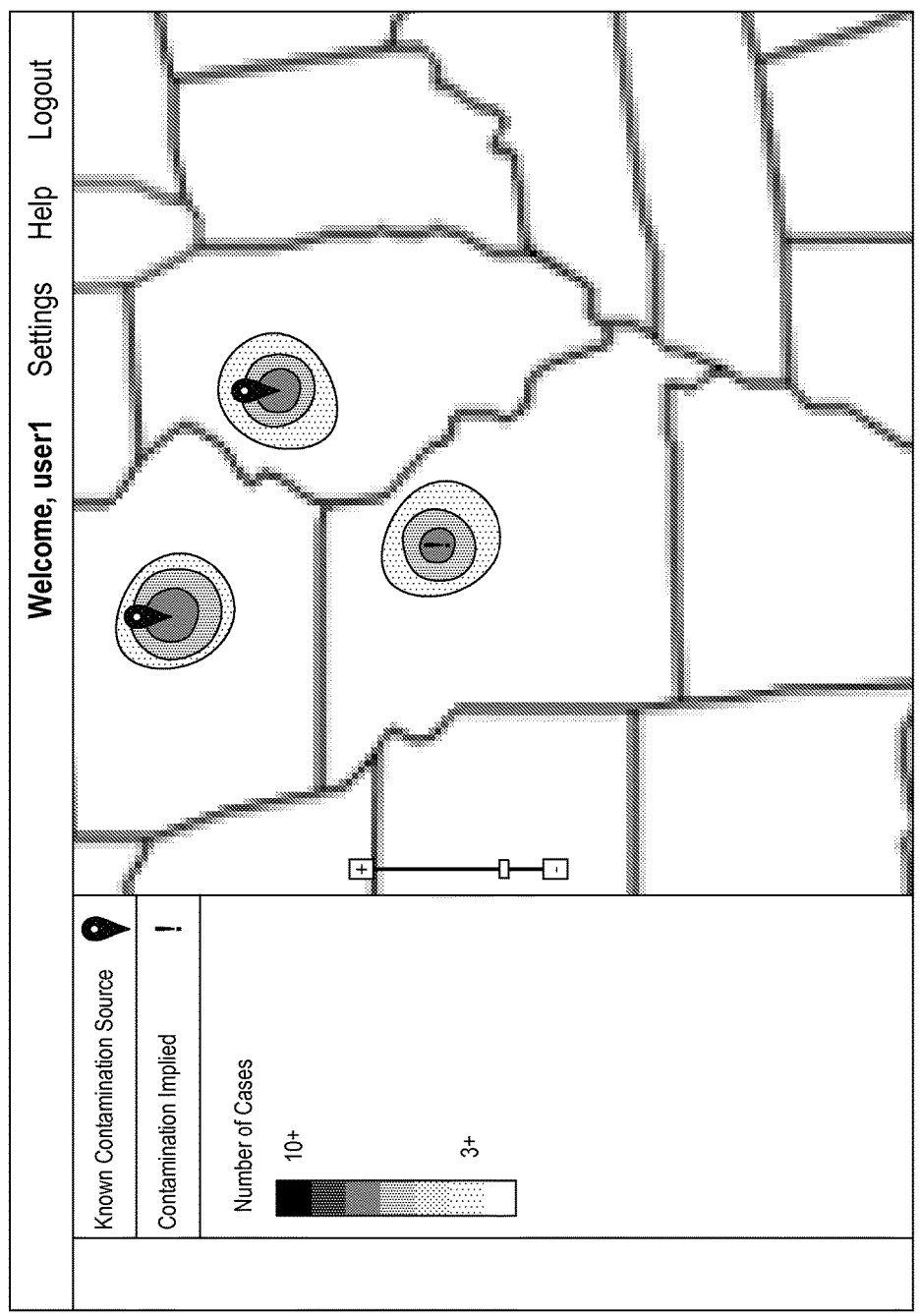
FIG. 4 illustrates display of a heat map on a contaminant visualization map.

In one or more preferred implementations, additionally or alternatively, heat maps are configured to be automatically displayed at larger scales as a user zooms out on a contaminant visualization map, as illustrated in FIG. 4. In accordance with one or more preferred implementations, dots or markers representing medical cases are displayed on a map when a contaminant visualization map is zoomed in, but blend together into heat maps when the contaminant visualization map is zoomed out to larger scales. In accordance with one or more preferred implementations, this occurs at a certain preconfigured or user configured zoom level or scale, while in one or more preferred implementations this occurs dynamically based on the number of dots or markers that would otherwise need to be displayed in an area on a map. In accordance with one or more preferred implementations, this is user configurable.

In accordance with one or more preferred implementations, a system is configured to automatically determine, based on a geographical pattern of medical cases, a location that is a possible source of contamination. For example, a system might determine that a location at the center of large number of medical cases associated with a contaminant is a possible source of contamination. In accordance with one or more preferred implementations, a system is configured to label this with a marker indicating it is an implied contamination source, as illustrated in FIG. 4.

Figure 5:
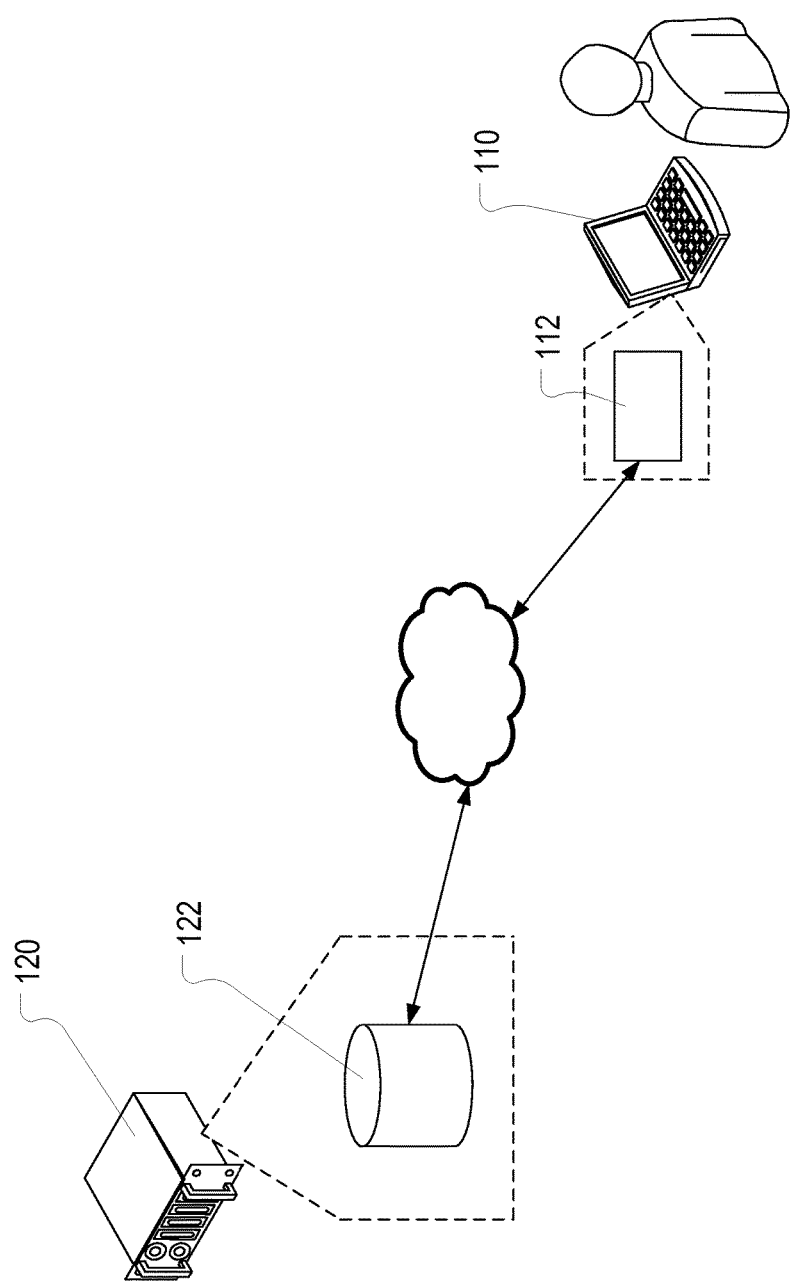
FIGS. 5-8 illustrate various system architectures in accordance with one or more preferred implementations.

In accordance with one or more preferred implementations, a software application 112 loaded on a computer 110 is configured to utilize case data to generate a visualization map. The application may utilize data stored locally, and/or data accessed from storage elsewhere, e.g. data saved at a data store 122 at a remote server 120 as illustrated in FIG. 5.

In accordance with one or more preferred implementations, an application disposed at a server is configured to utilize case data to generate a visualization map. In one or more preferred implementations, a server is configured to provide data representative of the generated visualization to other computers for display of the visualization map on the other computers. For example, in one or more preferred implementations, a user is able to access a visualization map generated at a server 230 via a software application 212 such as a web browser or thin client loaded on his or her computer 210, as illustrated in FIG. 6.

Figure 6:
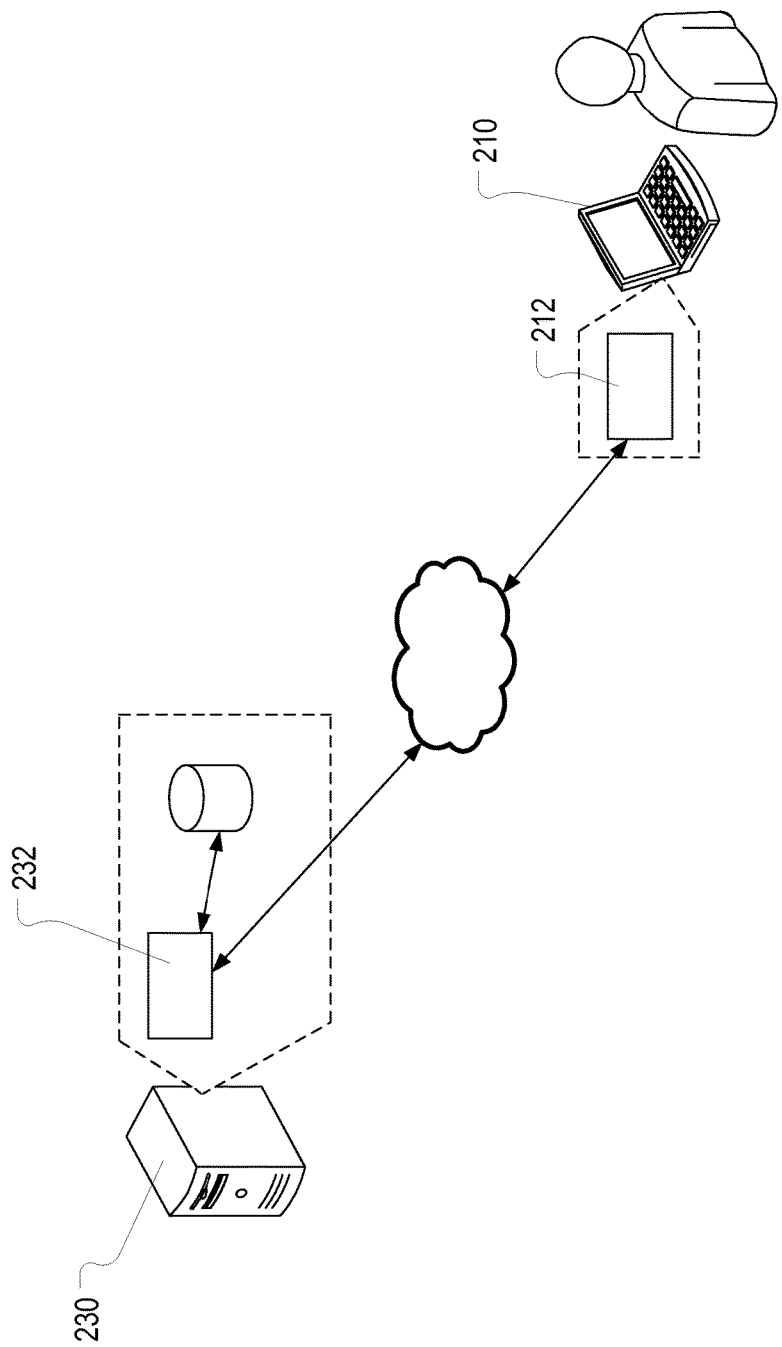
Figure 7:
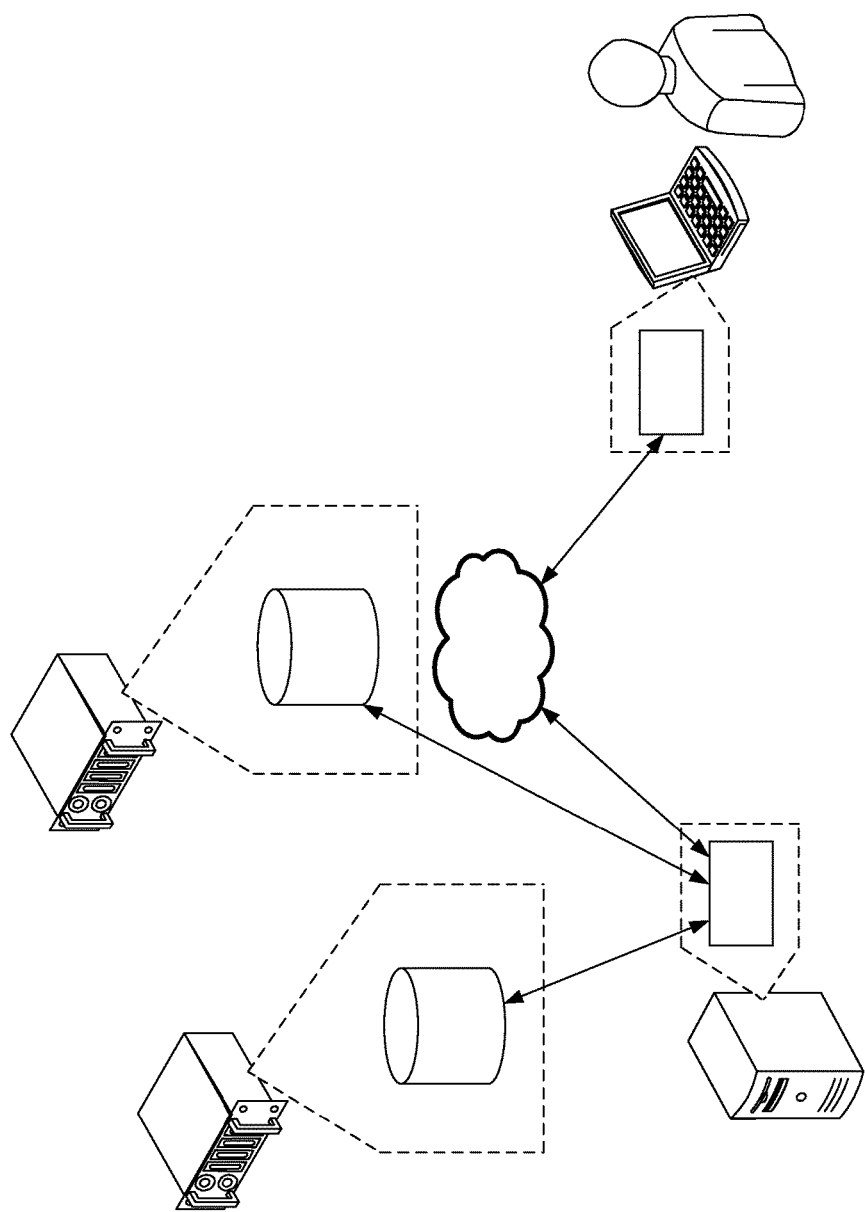
Figure 8:
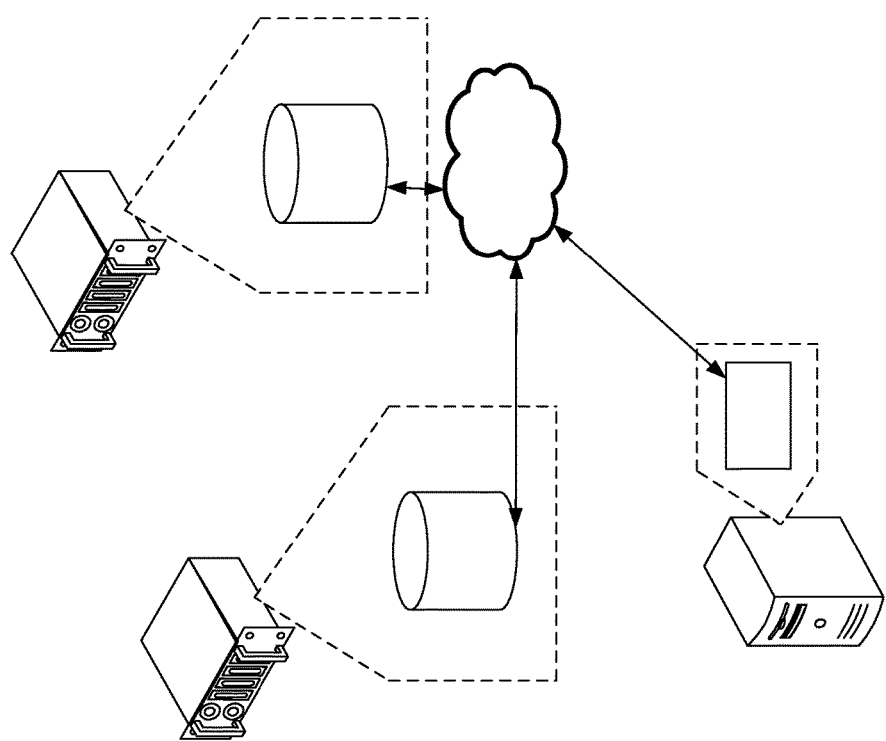

Data related to medical cases and contamination may be drawn from a data store disposed at the remote server, as illustrated in FIG. 6, or from one or more other data stores at one or more other remote servers, as illustrated in FIG. 7. Although communications between such servers are illustrated with a direct arrow for purposes of clarity, in one or more preferred implementations such communications preferably occur over the internet or another network, as illustrated in FIG. 8.

Thus, in accordance with one or more preferred implementations, data related to medical cases and contamination sources is drawn from one or more remote servers or data stores, e.g. a web server, cloud server, or database server.

In accordance with one or more preferred implementations, users can utilize an interface displaying a contaminant visualization map to add information regarding a medical case or contamination source associated with that contaminant to the visualization map, and information regarding that case is saved, e.g. to one or more remote servers or data stores. In accordance with one or more preferred implementations, a user may additionally be able to label a suspected or implied source of contamination, and information regarding that may be saved as well.

In accordance with one or more preferred implementations, one or more patient portals are utilized to allow patients to directly enter symptom data that can be utilized to generate a contaminant visualization map.

Figure 9:
FIG. 9 illustrates an exemplary interface of a patient portal which allows a patient to log in to the patient portal and provide information on symptoms they are experiencing.

FIG. 9 illustrates an exemplary interface of a patient portal which allows a patient to log in to the patient portal and provide information on symptoms they are experiencing. In one or more preferred implementations, a patient might be prompted to report symptoms they are experiencing when scheduling an appointment with their doctor.

These symptoms can be associated with a home, work, and/or other location of a patient, and can be saved for processing and potential use in generating a contaminant visualization map.

The patient portal may be a web based patient portal hosted at one or more web servers and accessed by a patient via a web browser, thin client, mobile application, or other application.

Figure 10:
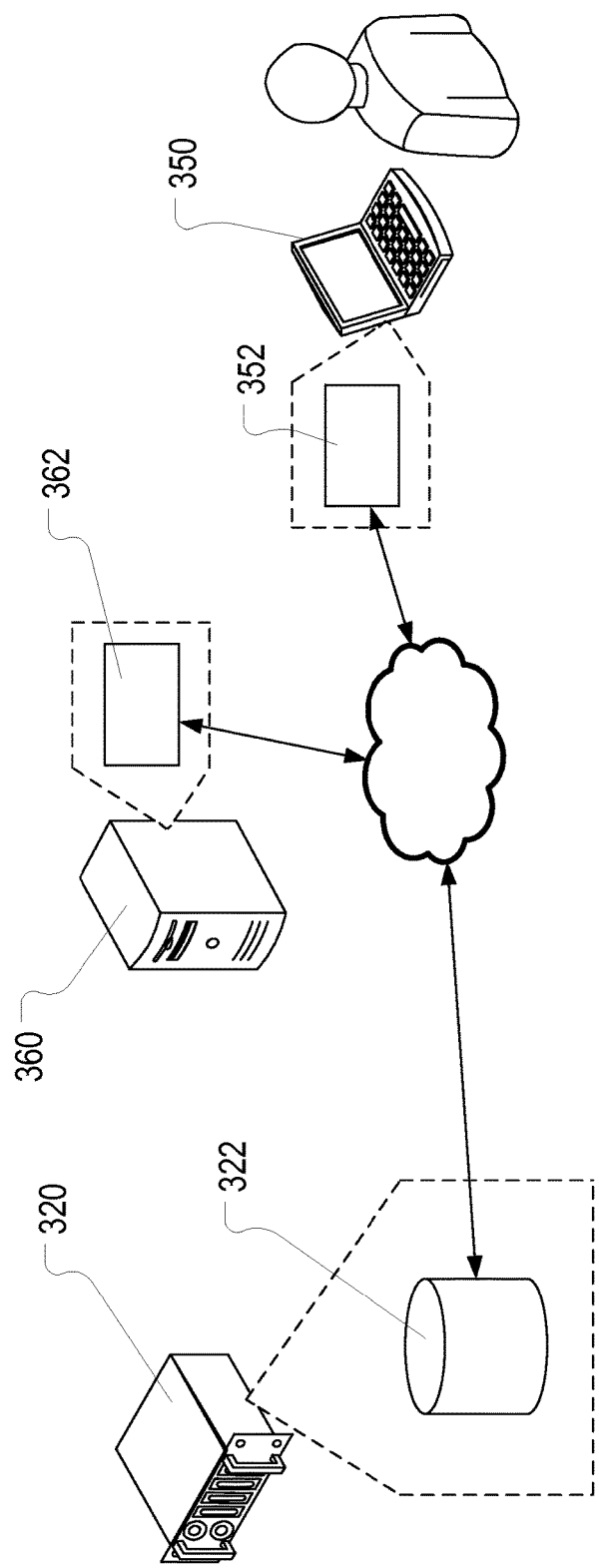
FIG. 10 illustrates an exemplary system in which a patient accesses a patient portal application at a web server via a web browser loaded on his or her computer.

FIG. 10 illustrates an exemplary system in which a patient accesses a patient portal application 362 at a web server 360 via a web browser 352 loaded on his or her computer 350, and uses the patient portal to report symptoms. Data associated with the symptoms and a location associated with the patient is then saved in a data store 322 at a server 320. Subsequently, this data can be accessed for generating a contaminant visualization map.

In one or more preferred implementations, symptoms, observations, and diagnoses of a medical professional may also be saved and utilized for processing and potential use in generating a contaminant visualization map.

It will be appreciated that while the diagnosis by a medical professional that a patient is suffering from exposure to a certain contaminant is easily converted into a marker on a visualization map (e.g. at a location corresponding to a believed location of exposure, or at a patient's home or work address), the reporting of symptoms by a patient or medical professional does not necessarily directly map to a contaminant without additional processing.

In accordance with one or more preferred implementations, a system is configured to analyze reported symptoms of a patient and correlate such symptoms with a possible contaminant. For example, a system may be configured to identify a patient reporting symptoms of headaches, confusion, drowsiness, severe diarrhea, convulsions, and changes in fingernail pigmentation as potentially suffering from arsenic poisoning. In accordance with one or more preferred implementations, a system might tentatively categorize this patient as suffering from possible arsenic poisoning, and identify this case as possible exposure to arsenic for purposes of generating an arsenic contaminant map. In one or more preferred implementations, a system might compare one or more locations associated with the patient to known locations of causes of arsenic contamination or known locations of other cases of arsenic poisoning in evaluating whether to label this case as a potential case of arsenic poisoning.

In accordance with one or more preferred implementations, symptom and diagnosis data is collected from an individual practice and its clients, and/or from a group of practices, and/or via an open-source-like sharing platform for all doctors and patients, and/or any other grouping. Data from groups may be combined or shared as needed to address a potential environmental contaminant.

In accordance with one or more preferred implementations, systems and methods disclosed herein are utilized for tracking contaminants such as from oil spills, groundwater contamination, etc.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method for generating a visualization for tracking an environmental contaminant, the method comprising:
   (a) accessing, by a first electronic device via a browser, a patient portal at a web server;
   (b) displaying, to a first patient via a display associated with the first electronic device, a patient portal interface for the patient portal configured to allow a user to select one or more symptoms they are suffering from;
   (c) receiving, from the first patient via one or more input devices associated with the first electronic device, input corresponding to identification of a first plurality of symptoms he or she is suffering from;
   (d) communicating, from the web server to a data store, data representative of the first plurality of symptoms together with data representative of one or more locations associated with the first patient;
   (e) accessing, by a second electronic device via a browser, the patient portal at the web server;
   (f) displaying, to a second patient via a display associated with the second electronic device, a patient portal interface for the patient portal configured to allow a user to select one or more symptoms they are suffering from;
   (g) receiving, from the second patient via one or more input devices associated with the second electronic device, input corresponding to identification of a second plurality of symptoms he or she is suffering from;
   (h) communicating, from the web server to a data store, data representative of the second plurality of symptoms together with data representative of one or more locations associated with the second patient;
   (i) accessing, by a third electronic device, data from the data store;
   (j) automatically identifying using one or more electronic processors, utilizing the data representative of the first plurality of symptoms identified by the first patient, the first patient as having been exposed to a particular contaminant;
   (k) automatically identifying using one or more electronic processors, utilizing the data representative of the second plurality of symptoms identified by the second patient, the second patient as having been exposed to the particular contaminant;
   (l) automatically generating using one or more electronic processors, utilizing the accessed data from the data store, a contaminant visualization map for the particular contaminant including
      (i) a plurality of markers each corresponding to a location associated with a medical case of a first plurality of medical cases associated with exposure to the particular contaminant, and
      (ii) one or more markers each corresponding to a location of an identified contamination source for the particular contaminant,
      (iii) wherein a first one of the plurality of markers was generated based on the automatic identification of the first patient as having been exposed to the particular contaminant and is located on the contaminant visualization map at a point corresponding to one of the one or more locations associated with the first patient,
- (iv) wherein a second one of the plurality of markers was generated based on the automatic identification of the second patient as having been exposed to the particular contaminant and is located on the contaminant visualization map at a point corresponding to one of the one or more locations associated with the second patient;
- (m) displaying, to a health worker via a display associated with a third electronic device, the contaminant visualization map;
- (n) receiving, from the health worker via an input device associated with the third electronic device, input corresponding to an indication to zoom out the contaminant visualization map;
- (o) automatically generating using one or more electronic processors, based on the accessed data from the data store, one or more heat maps corresponding to the first plurality of medical cases associated with exposure to the particular contaminant;
- (p) updating, in response to the received input corresponding to an indication to zoom out the contaminant visualization map, the contaminant visualization map to
  - (i) be zoomed out,
  - (ii) not display the plurality of markers each corresponding to a location associated with a medical case, and
  - (iii) display the generated one or more heat maps.

2. The method of claim 1, wherein the web server comprises one or more physical servers.

3. The method of claim 1, wherein the web server comprises a cloud server.

4. The method of claim 1, wherein each of the plurality of markers corresponding to a location associated with a medical case is a dot.

5. The method of claim 1, wherein each of the plurality of markers corresponding to a location associated with a medical case is a flag.

6. The method of claim 1, wherein each of the plurality of markers corresponding to a location associated with a medical case is a pin.

7. The method of claim 1, wherein a user can click on one of the plurality of markers corresponding to a location associated with a medical case to get more information for that medical case.

8. The method of claim 1, wherein a user can hover over one of the plurality of markers corresponding to a location associated with a medical case to get more information on that medical case.

9. The method of claim 1, wherein the first electronic device comprises a laptop.

10. The method of claim 1, wherein the first electronic device comprises a tablet.

11. The method of claim 1, wherein the first electronic device comprises a desktop computer.

12. The method of claim 1, wherein the first electronic device comprises a phone.

13. The method of claim 1, wherein the third electronic device comprises a laptop.

14. The method of claim 1, wherein the third electronic device comprises a tablet.

15. The method of claim 1, wherein the third electronic device comprises a desktop computer.

16. The method of claim 1, wherein the third electronic device comprises a phone.

17. The method of claim 1, wherein the one or more input devices associated with the first electronic device comprise a mouse and keyboard.

18. The method of claim 1, wherein the one or more input devices associated with the first electronic device comprise a touch screen.

19. A method for generating a visualization for tracking an environmental contaminant, the method comprising:
- (a) loading, at a first electronic device, a patient portal application;
- (b) displaying, to a first patient via a display associated with the first electronic device, a patient portal interface for the patient portal application configured to allow a user to select one or more symptoms they are suffering from;
- (c) receiving, from the first patient via one or more input devices associated with the first electronic device, input corresponding to identification of a first plurality of symptoms he or she is suffering from;
- (d) communicating, from the web server to a data store, data representative of the first plurality of symptoms together with data representative of one or more locations associated with the first patient;
- (e) loading, at a second electronic device, the patient portal application;
- (f) displaying, to a second patient via a display associated with the second electronic device, a patient portal interface for the patient portal application configured to allow a user to select one or more symptoms they are suffering from;
- (g) receiving, from the second patient via one or more input devices associated with the second electronic device, input corresponding to identification of a second plurality of symptoms he or she is suffering from;
- (h) communicating, from the web server to a data store, data representative of the second plurality of symptoms together with data representative of one or more locations associated with the second patient;
- (i) accessing, by a third electronic device, data from the data store;
- (j) automatically identifying using one or more electronic processors, utilizing the data representative of the first plurality of symptoms identified by the first patient, the first patient as having been exposed to a particular contaminant;
- (k) automatically identifying using one or more electronic processors, utilizing the data representative of the second plurality of symptoms identified by the second patient, the second patient as having been exposed to the particular contaminant;
- (l) automatically generating using one or more electronic processors, utilizing the accessed data from the data store, a contaminant visualization map for the particular contaminant including
  - (i) a plurality of markers each corresponding to a location associated with a medical case of a first plurality of medical cases associated with exposure to the particular contaminant, and
  - (ii) one or more markers each corresponding to a location of an identified contamination source for the particular contaminant,
  - (iii) wherein a first one of the plurality of markers was generated based on the automatic identification of the first patient as having been exposed to the particular contaminant and is located on the contaminant visualization map at a point corresponding to one of the one or more locations associated with the first patient,
(iv) wherein a second one of the plurality of markers was generated based on the automatic identification of the second patient as having been exposed to the particular contaminant and is located on the contaminant visualization map at a point corresponding to one of the one or more locations associated with the second patient;
(m) displaying to an indication to zoom out the contaminant visualization map;
(o) automatically generating using one or more electronic processors, based on the accessed data from the data store, one or more heat maps corresponding to the first plurality of medical cases associated with exposure to the particular contaminant;
(p) updating, in response to the received input corresponding to an indication to zoom out the contaminant visualization map, the contaminant visualization map to
(i) be zoomed out,
(ii) not display the plurality of markers each corresponding to a location associated with a medical case, and
(iii) display the generated one or more heat maps.

20. A method for generating a visualization for tracking an environmental contaminant, the method comprising:
(a) automatically generating using one or more electronic processors, utilizing accessed data from one or more data stores, a contaminant visualization map for a particular contaminant including
(i) a plurality of markers each corresponding to a location associated with a medical case of a first plurality of medical cases associated with exposure to the particular contaminant, and
(ii) one or more markers each corresponding to a location of an identified contamination source for the particular contaminant;
(b) displaying, via a display associated with an electronic device, the contaminant visualization map;
(c) receiving, via an input device associated with an electronic device, input corresponding to an indication to zoom out the contaminant visualization map;
(d) automatically generating using one or more electronic processors, based on the accessed data from the data store, one or more heat maps corresponding to the first plurality of medical cases associated with exposure to the particular contaminant;
(e) updating, in response to the received input corresponding to an indication to zoom out the contaminant visualization map, the contaminant visualization map to
(i) be zoomed out,
(ii) not display the plurality of markers each corresponding to a location associated with a medical case, and
(iii) display the generated one or more heat maps.

\* \* \* \* \*